3,235,466
FUEL ELEMENTS FOR NUCLEAR REACTORS
David William Williams and John George Edwards, Seascale, Cumberland, and Arthur William Shilling, Holmrock, Cumberland, England, assignors to United Kingdom Atomic Energy Authority, London, England
Filed Dec. 13, 1960, Ser. No. 75,624
Claims priority, application Great Britain, Dec. 29, 1959, 44,162/59
7 Claims. (Cl. 176—68)

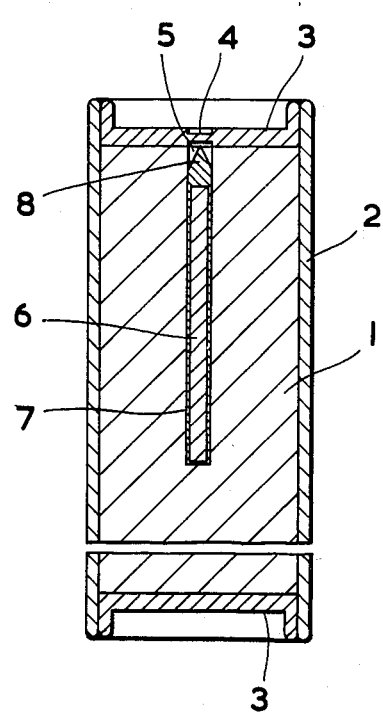

This invention relates to fuel elements for nuclear reactors and is concerned with fuel elements of the kind comprising a nuclear fuel member enclosed in a protective sheath.

The purpose of the protective sheath enclosing a nuclear fuel member is to retain fission products within the fuel element and to prevent reaction between the fuel member and the coolant. It is therefore desirable that the integrity of the sheath should be maintained, if possible, and that any leaks developing in the sheath should be detected. To this end apparatus has been devised for detecting in the coolant the presence of short-lived fission products which have escaped through leaks in the sheath. However, the nature of any leak may be such that ingress of coolant occurs preferentially to outleakage of fission products such as would give rise to a recognisable signal on the detection apparatus. Ingress of coolant can supply a medium in which, under the conditions prevailing during normal operation of the reactor, oxidation of the fuel member takes place, which is undesirable, and such oxidation of the fuel member may proceed without any warning to the operating staff and a serious condition might arise.

According to the present invention a nuclear reactor fuel element comprising a nuclear fuel member enclosed in a protective sheath has included within the sheath a substance which, at a temperature above the normal operating temperature for the fuel element, expands more rapidly than the fuel member and the sheath so as to distort the sheath.

Should oxidation of a fuel member occur within its sheath the oxidation products will inhibit heat transfer from that part of the fuel member so that its temperature rises. The included substance will then expand and distortion of the sheath will follow. Distortion of the sheath may be detected by a strain indicator such as that described in copending applications Serial Nos. 53,720 and 53,826, filed September 2, 1960, now U.S. Patents Nos. 3,147,190 and 3,164,528, respectively, or by breaching of the sheath to release fission products which may be detected by conventional monitoring of the coolant.

Expansion of the substance may be effected by melting, sublimation or chemical change, for example. In one example in which the fuel is uranium and the sheath is magnesium alloy the substance may be aluminum which is inserted in a small hole drilled in the uranium fuel member. With a sheath of beryllium or stainless steel the substance may be magnesium instead of aluminum. The aluminum or magnesium may be in strip form and may be enveloped in a niobium sheath with a sharp point at one end which breaches the sheath on melting and expansion of the aluminium or magnesium. In another example embodying the invention, the substance is uranium iodide which can be vaporized by sublimation and so distort the sheath by its vapour pressure, such distortion being detectable by a strain gauge as aforesaid. Uranium iodide may also be used in conjunction with the niobium-sheathed aluminium or magnesium strip or with any other means for breaching the sheath above the normal operating temperature of the fuel element. The pressure of uranium iodide vapour formed on sublimation will then drive fission products through a breach in the sheath and make detection easier. In this way accidental breaches (i.e. breaches caused by failure of the sheath material, by faulty end cap welds, by damage etc.) in a fuel element sheath may also be detected.

An example of one way of carrying the invention into effect will now be described with reference to the accompanying drawing which is a sectional view.

In the drawing is shown a uranium fuel member 1 in a protective sheath 2 closed by end caps 3 welded to the sheath 2. One end cap 3 has a weakened zone 4. Below the weakened zone 4 the uranium fuel member 1 is drilled to provide a hole 5 which contains an aluminium strip 6 enveloped in a niobium sheath 7 having a pierce 8 immediately below the zone 4. Should the weld between the sheath 2 and cap 3 be faulty and allow carbon dioxide coolant to leak into the fuel element while it is loaded in a nuclear reactor oxidation of the fuel member 1 will occur so that oxide builds up on the fuel member between the member and the sheath and acts as an insulating band. The uranium temperature then rises, the aluminium strip 6 melts and expansion of the aluminium pushes the pierce 8 through the weakened zone 4. Fission products are thus able to escape from the faulty fuel element without relying on egress through the faulty weld and are therefore more readily detected on the conventional apparatus for detecting the presence of fission products in the reactor coolant.

In the example of the invention utilizing uranium iodide, the uranium iodide member is used as an alternative to the niobium sheathed aluminum strip specifically shown in the drawing.

We claim:
1. A nuclear reactor fuel element comprising a nuclear fuel member of fissionable material, a protective sheath enclosing the fuel member, a solid substance within the sheath, said solid substance being of a material which changes state at a temperature below the melting temperature of the fuel member, and a pierce member associated with the solid substance, the pierce member being positioned to breach the sheath in response to the change of state of the solid substance.

2. A nuclear reactor fuel element according to claim 1 wherein uranium iodide is included in the sheath in addition to said solid substance.

3. A nuclear reactor fuel element comprising a nuclear fuel member of fissionable material, a protective sheath enclosing the fuel member, and a solid substance within the sheath, said solid substance being of a material which sublimes to a vapour at a temperature below the melting point of the fuel member, the solid substance vaporising to distort the sheath when the fuel member reaches the temperature of sublimation of the solid substance.

4. A nuclear reactor fuel element according to claim 3 wherein the solid substance is uranium iodide.

5. A nuclear reactor fuel element comprising, in combination, a nuclear fuel member of fissionable material in elongate form, an elongate protective sheath enclosing the fuel member, and an elongate strip coaxial with the fuel member within the sheath to engage and distort the sheath at a predetermined temperature below the melting point of the fuel member, said strip comprising a substance which changes state from solid to liquid at the said predetermined temperature, said substance expanding on the change of state, and further comprising sheath means enclosing the strip and a pierce member associated with the substance and acting to pierce the sheath in response to the expansion of the substance on change of state.

6. A nuclear fuel element according to claim 5 wherein the sheath is weakened at the point at which the pierce member acts.

7. A nuclear reactor fuel element comprising, in combination, a nuclear fuel member of fissionable material in elongate form, an elongate protective sheath enclosing the fuel member, and an elongate strip coaxial with the fuel member within the sheath to engage and distort the sheath at a predetermined temperature below the melting point of the fuel member, said strip comprising a solid substance which changes state by sublimation from the solid to a vapor at said predetermined temperature, said substance expanding on the change of state to engage and distort the sheath.

References Cited by the Examiner

UNITED STATES PATENTS

| | | | |
|---|---|---|---|
| 2,716,229 | 8/1955 | Wehrmann et al. | |
| 2,777,812 | 1/1957 | Powell et al. | 176—19 |
| 2,849,388 | 8/1958 | Brugmann | 176—74 |
| 2,855,355 | 10/1958 | Ohlinger et al. | 176—80 |
| 2,872,401 | 2/1959 | Wigner et al. | 176—82 |
| 2,873,853 | 2/1959 | Burton | 204—193.2 |
| 2,986,509 | 5/1961 | Duffy | 176—64 |
| 2,987,445 | 6/1961 | Huston et al. | |
| 3,037,924 | 6/1962 | Creutz | 176—68 |
| 3,088,891 | 5/1963 | Foote et al. | 176—72 |

OTHER REFERENCES

Nuclear Power, July 1959, pages 77–99.

TID–7559 (part 1), Fuel Elements Conference, Aug. 1959, pages 268 and 270.

REUBEN EPSTEIN, *Primary Examiner.*

ROGER L. CAMPBELL, OSCAR R. VERTIZ, CARL D. QUARFORTH, *Examiners.*